No. 689,263. Patented Dec. 17, 1901.
E. C. & F. P. WHITAKER.
VEHICLE TIRE.
(Application filed May 31, 1901.)
(No Model.) 2 Sheets—Sheet 1.
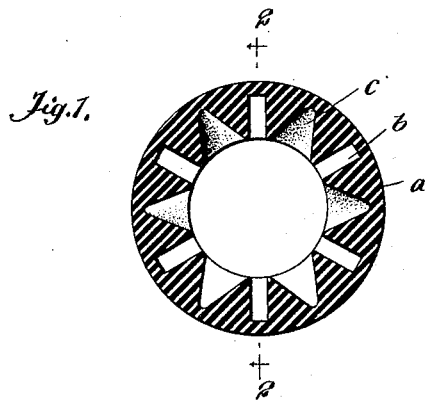
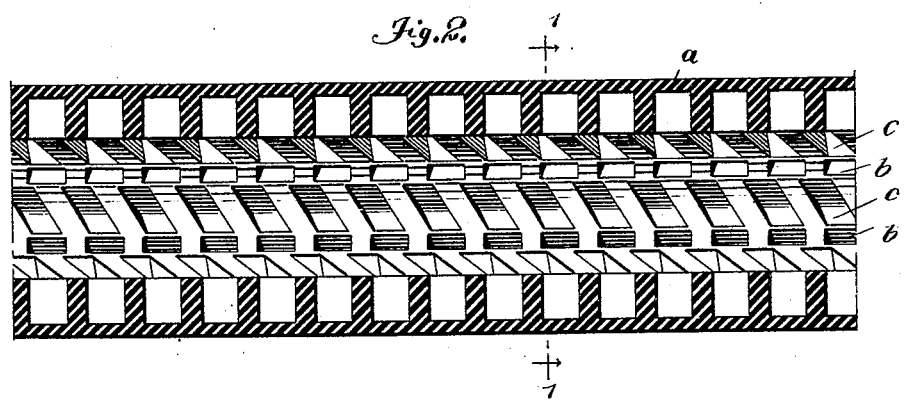
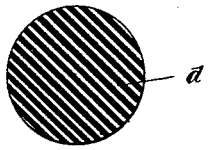
WITNESSES:
INVENTORS
Earl C. Whitaker
Frank P. Whitaker
BY
ATTORNEYS No. 689,263. Patented Dec. 17, 1901.
E. C. & F. P. WHITAKER.
VEHICLE TIRE.
(Application filed May 31, 1901.)
(No Model.) 2 Sheets—Sheet 2.
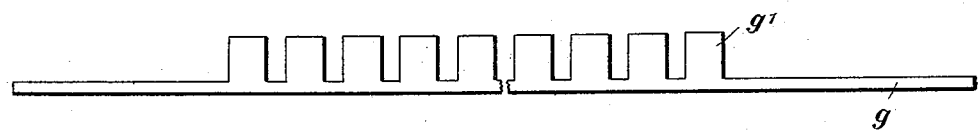
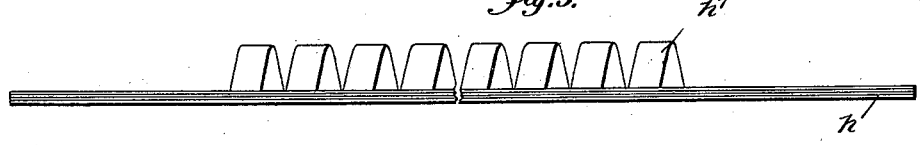
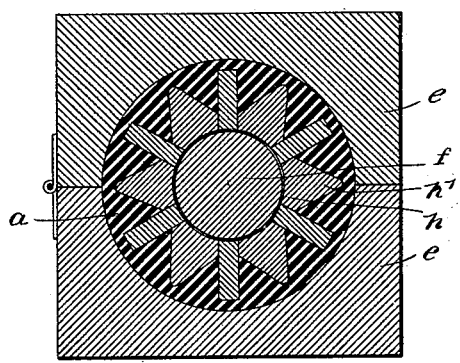
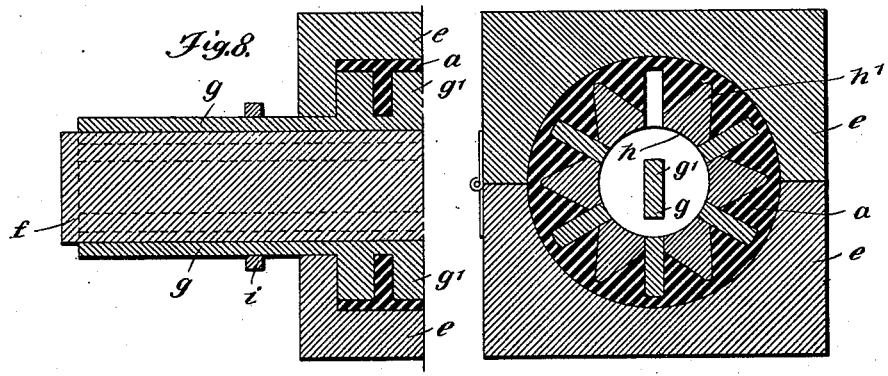
WITNESSES:
INVENTORS
Earl C. Whitaker
Frank P. Whitaker
BY
ATTORNEYS

UNITED STATES PATENT OFFICE.

EARL CHANDLER WHITAKER AND FRANK PERSIA WHITAKER, OF PROVIDENCE, RHODE ISLAND.

VEHICLE-TIRE.

SPECIFICATION forming part of Letters Patent No. 689,263, dated December 17, 1901.

Application filed May 31, 1901. Serial No. 62,511. (No model.)

*To all whom it may concern:*

Be it known that we, EARL CHANDLER WHITAKER and FRANK PERSIA WHITAKER, citizens of the United States, and residents of Providence, in the county of Providence and State of Rhode Island, have invented a new and Improved Vehicle-Tire, of which the following is a full, clear, and exact description.

This invention relates to a tire adapted especially for bicycles and other velocipedes, but useful, of course, in connection with vehicles of any sort.

The invention involves a certain peculiar formation of the tire by means of which all the advantages of the pneumatic tire are attained without the disadvantage of inflating the tire and the possibility of a puncture disabling it.

This specification is a specific description of one form of the invention, while the claim is a definition of the actual scope thereof.

Reference is to be had to the accompanying drawings, forming a part of this specification, in which similar characters of reference indicate corresponding parts in all the views.

Figure 1 is a sectional view of the invention on the line 1 1 of Fig. 2. Fig. 2 is a sectional view on the line 2 2 of Fig. 1, said view illustrating a part of the tire in finished condition. Fig. 3 is a sectional view of the core which is fitted in the tire shown in Figs. 1 and 2. Figs. 4 and 5 are fragmentary side elevations of the mold-sections. Fig. 6 is a cross-section showing the core and the mold-sections of Figs. 4 and 5 assembled. Fig. 7 is a cross-section showing the core and the mold-sections in place within the exterior mold and illustrating the disposition of the rubber within the mold. Fig. 8 is a section showing the end portions of the mold-sections and the core, and Fig. 9 is a cross-section illustrating the manner of removing the tire from the mold.

As illustrated in Figs. 1, 2, and 3, the finished tire is in the form of a tube $a$, preferably of soft rubber and having a smooth exterior surface, and the interior surface being formed with longitudinal lines of orifices $b$, alternating between longitudinal lines of orifices $c$. The orifices $b$ are elongated in form and are arranged in alinement with each other and longitudinally of the tube, while the orifices $c$ are disposed diagonally of the axis of the tube. This gives the tire a honeycomb form, and while the exterior surface is smooth and unbroken the honeycomb structure of the tire provides a yielding structure on which the vehicle is carried. When the tube, as shown in Figs. 1 and 2, is formed, a soft-rubber core $d$ (see Fig. 3) is introduced into the tube, and then the tube, with the core, is bent into circular form and its ends cemented or otherwise joined together to form the complete tire. Now it will be seen that a tire of this construction is not influenced by puncturing, and necessarily it will furnish fully the degree of resiliency which is characteristic of a pneumatic or inflated tire. The honeycomb form of the tube retains the external shape when not under pressure, and when under pressure it allows the tire to give with the weight that is placed upon it.

Figs. 4 to 9 show the manner of forming the tire. In Figs. 7, 8, and 9, $e$ represents the sections of the exterior mold, which sections are hingedly connected together, as shown. The interior mold is made up of a metallic core $f$, around which are placed a number of strips of metal $g$ and $h$, such strips being provided with projections $g'$ and $h'$, respectively, the projections $g'$ lying in line with each other and the projections $h'$ being disposed diagonally across the strip $h$. These strips $g$ and $h$, when laid on the core, as shown in Fig. 6, are fastened in place by rings or ferrules $i$, engaging their end portions. (See Fig. 8.) The interior mold, as shown in Fig. 8, is then inserted between the sections $e$ of the exterior mold, and the rubber is molded between the two parts. The projections $g'$ produce the recesses $b$ in the tire, and the projections $h'$ produce the recesses $c$. When the rubber has been properly molded, the core $f$ is withdrawn, and then the strips $g$ and $h$ are moved inward in the manner shown in Fig. 9, so that they are disengaged from the rubber, and then may be withdrawn longitudinally out of the mold. After the strips $g$ and $h$ have been completely withdrawn the sections of the mold are opened, and the tube $a$, as shown in Figs. 1 and 2, is then finished. When this has been done, it only remains to insert the rubber or other yielding core $d$, and then the tire is finished. After the tire has been finished its exterior surface may of course be covered with canvas, or an additional thickness of rubber may be vulcanized around it, as desired. In fact, any structure may be put on the outside of the tire without in any way affecting the essentialities of the invention.

Having thus described our invention, we claim as new and desire to secure by Letters Patent—

A vehicle-tire, comprising a resilient tube having a relatively smooth outer surface and having its inner surface formed with a honeycombed structure produced by a series of lines of longitudinally-disposed orifices alternating between longitudinal lines of diagonally-disposed orifices, and a resilient core extending through the tube and engaging the said honeycombed inner surface thereof.

In testimony whereof we have signed our names to this specification in the presence of two subscribing witnesses.

EARL CHANDLER WHITAKER.
FRANK PERSIA WHITAKER.

Witnesses:
GILMAN E. JOPP,
WILLIAM W. MORGAN.